E. HORTON.
GRAIN-BINDER.

No. 186,930.

Patented Feb. 6, 1877.

Witnesses.
John Johnson
Amos Whitney

Inventor.
Emmet Horton.

E. HORTON.
GRAIN-BINDER.

No. 186,930. Patented Feb. 6, 1877.

Witnesses.
John Johnson
Amos Whitney

Inventor.
Emmit Horton

E. HORTON.
GRAIN-BINDER.

No. 186,930. Patented Feb. 6, 1877.

Witnesses:
John Johnson
Amos Whitney

Inventor:
Emmet Horton

E. HORTON.
GRAIN-BINDER.

Patented Feb. 6, 1877.

Witnesses.
John Johnson
Amos Whitney

Inventor.
Emmet H Horton

E. HORTON.
GRAIN-BINDER.

No. 186,930.

Patented Feb. 6, 1877.

Witnesses.
John Johnson
Amos Whitney

Inventor.
Emmet Horton

E. HORTON.
GRAIN-BINDER.

No. 186,930. Patented Feb. 6, 1877.

Witnesses.
John Johnson
Amos Whitney

Inventor.
Emmet Horton.

E. HORTON.
GRAIN-BINDER.

No. 186,930. Patented Feb. 6, 1877.

Witnesses
John Johnson
Amos Whitney

Inventor
Emmett Horton

E. HORTON.
GRAIN-BINDER.

No. 186,930.  Patented Feb. 6, 1877.

WITNESSES:
R. O. Humphrey
H. O'Flaherty

INVENTOR.
Emmet Horton
By W. E. Simonds,
ATTORNEY.

E. HORTON.
GRAIN-BINDER.

No. 186,930. Patented Feb. 6, 1877.

WITNESSES:
R. O. Humphrey
H. O'Flaherty

INVENTOR.
Emmit Horton
By W. E. Simonds
ATTORNEY.

N. PETERS, PHOTO-LITHOGRAPHER, WASHINGTON, D. C.

E. HORTON.
GRAIN-BINDER.

No. 186,930. Patented Feb. 6, 1877.

WITNESSES:
R. C. Humphrey
H. O'Flaherty

INVENTOR.
Emmet Horton
By W. E. Simonds
ATTORNEY.

E. HORTON.
GRAIN-BINDER.

No. 186,930. Patented Feb. 6, 1877.

WITNESSES:
R. J. Humphrey
H. O'Flaherty

INVENTOR.
Emmet Horton
By W. E. Simonds
ATTORNEY.

E. HORTON.
GRAIN-BINDER.

No. 186,930. Patented Feb. 6, 1877.

WITNESSES:
R. D. Humphrey.
H. O'Flaherty.

INVENTOR.
Emmet Horton
By W. E. Simonds
ATTORNEY.

UNITED STATES PATENT OFFICE.

EMMET HORTON, OF HARTFORD, CONNECTICUT, ASSIGNOR OF TWO-THIRDS HIS RIGHT TO AMOS WHITNEY AND JOHN JOHNSON, OF SAME PLACE.

IMPROVEMENT IN GRAIN-BINDERS.

Specification forming part of Letters Patent No. 186,930, dated February 6, 1877; application filed December 22, 1876.

*To all whom it may concern:*

Be it known that I, EMMET HORTON, of Hartford, Hartford county, Connecticut, have invented certain new and useful Improvements in Binding Attachments for Harvesters, of which the following is a specification:

This apparatus is intended to be attached to and operated by the reaper, which has a rake which sweeps the grain into the grasp of the binder.

In some respects this apparatus is but a modification of and improvement upon apparatus for similar purpose for which I have made previous application for Letters Patent.

In the drawings, Fig. 3 is a left-side view of the binding apparatus with the cover on.

The remainder of the drawings refer to modifications, and will be hereinafter described.

The grain being swept by the rake operated by the reaper within the parti-circle formed by the sheet-metal guard $d^{20}$, the grasper-arm $e$, pivoted by its butt-end in the frame of the binder, swings down and grasps and presses the grain, and holds it there till bound, when it swings and releases the bundle.

This grasper-arm is operated as follows: On the shaft $e^1$ is the clutch-half $e^2$, made to revolve with the shaft, but free to move a certain distance upon it lengthwise of the shaft. This clutch-half $e^2$ is pressed toward the clutch-half $e^3$ by the spring $e^4$, the tension of which can be regulated by the nut $e^5$. The clutch-half $e^3$ is upon the hub $e^6$, (loose on shaft $e^1$,) from which extends rigidly the arm $e^7$, jointed at its end to the pitman $e^8$, the free end of which bears a rack, $e^9$, meshing into the pinion $e^{10}$, which is upon the hub at the butt-end of the grasper-arm. The shaft $e^1$, revolving, causes, by means of the engaging clutch-halves, the arm $e^7$, and consequently the grasper-arm, to move forward till the resistance of the grain overcomes the tension of spring $e^4$, when the clutch-half $e^2$ is disengaged from clutch-half $e^3$, and the grasping movement of the grasper-arm is stopped. The grain is held there grasped by pawl $e^{11}$, striking into ratchet $e^{12}$ on hub $e^6$. At the proper time the projection $e^{13}$ on box $e^{14}$, which revolves with shaft $e^1$, strikes and raises pawl $e^{11}$, and holds it raised, (while the binder is in the position of rest,) freeing the grasper-arm, which is returned to position of rest by spring $e^{15}$, which also holds pawl $e^{11}$ to its work. The guard $e^{16}$ serves to keep pitman $e^8$ down upon its pinion, the pin $e^{17}$ projecting from the side of the pitman, and following along the under side of the guard.

Figure 11:
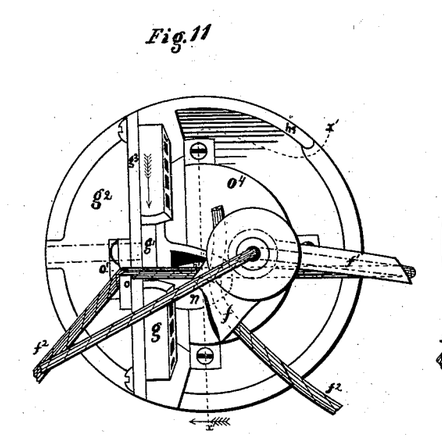
Fig. 11 is a view of the knot-tying parts only, (a front view as to the whole machine,) after the needle-arm has moved up from the normal position of rest, carrying the twine through the slot in the slotted disk.

Immediately after the grasper-arm swings down and grasps the grain into a bundle the needle-arm $f$, pivoted in the frame of the binder, swings up through a slot cut for it in the sheet-metal guard, into position indicated in dotted lines in Fig. 11. This needle-arm carries upon one side, near its free end, a right-angular hollow needle, $f^1$, through which the twine $f^2$, coming from spool $f^3$ underneath the guard, its tension regulated by screw $f^4$, passes to bind the bundles. The needle-arm is operated from gear $d^{19}$, through the medium of connecting-rod $f^5$, jointed to lever $f^6$, which is jointed at its other end to a stationary support, and bears on one side, between its two ends, a truck-covered pin, projecting into cam-groove $f^7$, the shape of which is such as to give the needle-arm the movements herein described for it.

Figure 6:
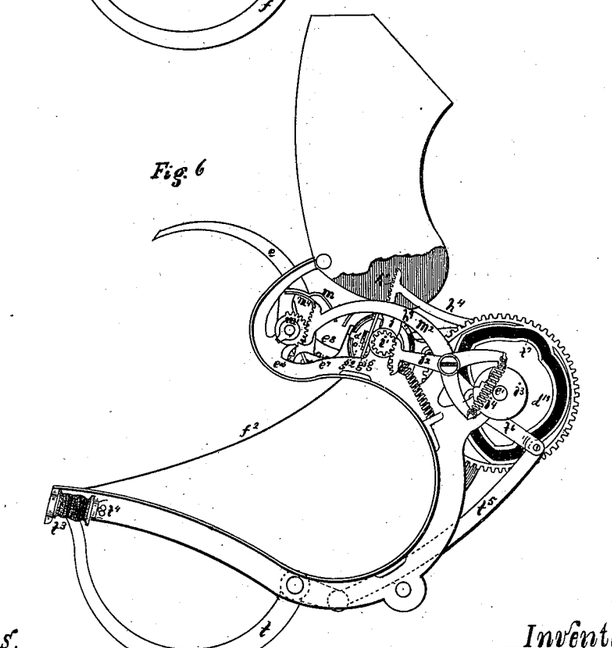
Fig. 6 is a side elevation of the reverse side of the binding apparatus from that shown in Fig. 5, with the parts in the same adjustment.
Figure 7:
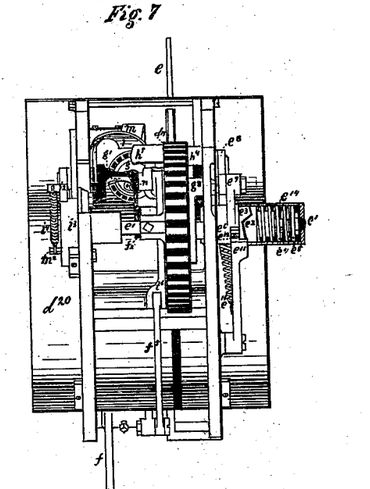
Fig. 7 is a rear-elevation view of the binding apparatus in the same adjustment as in Figs. 5 and 6. With reference to its position on the reaping-machine, this view is an end view from the end which has the main driving-wheel.

When the grain is swept into the binder the twine is (previously) fastened by one end into a twine-hold on the face of the slotted disk, (parts hereinafter described,) and runs thence down and through the twine-needle to the spool, as seen in Fig. 6, and the grain, being swept into the binder, pushes back the twine, and causes it to partially encircle the grain.

When the needle-arm moves up, as indicated in dotted lines in Fig. 11, the twine wholly encircles the grain. That which I have spoken of as the slotted disk is denoted by the letter $g$, and its slot by $g^1$. It admits of variations in some respects; but it is essential that it should rotate and be slotted from one side to an open center.

In the present mechanism this disk is borne by and partly in the disk-box $g^2$, being secured in place by screw-cap $g^3$, thus allowing the disk to rotate freely. The rotations of the slotted disk are given by the bevel-pinion $g^4$, meshing into a sunken bevel-gear on the face of the disk, and having one large tooth, $g^5$, to fill slot $g^1$.

In the description of the operation of the knot-tying parts, I speak of the rotation of the slotted disk in the disk-box as "lateral revolutions," and I term that direction of this revolution which gives twist to the twine "forward." The disk-box has itself a rotation, and in such rotation carries the slotted disk with it. This latter kind of rotation I term "longitudinal," whether speaking of the disk or disk-box, and that direction of this revolution which moves the top of the disk-box away from the main driving-wheel I term "forward." The disk-box is borne upon the end of the sleeve-shaft $g^6$, on the other end of which is the gear $g^7$, which is operated by a rack, $g^8$, giving the rotations of the disk-box. The sleeve-shaft $g^6$ incloses and rotates upon the shaft $g^9$, to which pinion $g^4$ is fixed, and bears the pinion $h$, which is operated by rack $h^1$, and gives the lateral revolutions of the slotted disk.

Figure 10:
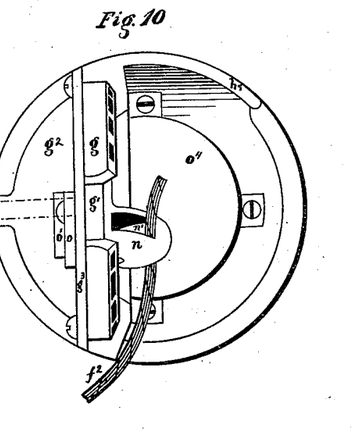
Fig. 10 is a detail view of the knot-tying parts only, in the adjustment which these parts have in the normal position of rest, the position shown in Figs. 5, 6, 7, and 8. With reference to the whole machine, it is a view from the front.

Shaft $g^9$ finds an end bearing in the part $h^2$, part of the frame, and the sleeve-shaft $g^6$ finds a bearing in similar part, $h^3$. The rack $h^1$ is upon the end of rack-arm $h^4$, which is pivoted at its rear end to frame of binder, and has its motions given by cam-groove $h^5$ in the side of gear-disk $d^{19}$, acting on a truck-covered pin, $h^6$, on the side of the rack-arm. The rack $g^8$ is on the end of the rack-arm $h^7$, which is pivoted at its rear end to frame of binder, and has its motions given by cam-groove $h^8$, acting on a truck-covered pin projecting from side of rack-arm. The shape of these two cam-grooves is such as to give the slotted disk and disk-box the movements herein described for them. When the needle-arm first moves up, the slotted disk is in the position represented in Figs. 10 and 11, the position of rest, with the slot in the disk pointing toward the front of the reaper. When the needle-arm thus moves up, the twine-needle passes through the center of the slotted disk and past it, toward the main driving-wheel, assuming the position shown in Fig. 11. The two ends of the twine are thus carried past each other, as is done by a person in tying a knot with his fingers.

When I say the "ends" I am speaking of that point in the twine proceeding from the twine-needle as an end, while it is not really an end, but is practically so for the purposes of this description.

Figure 12:
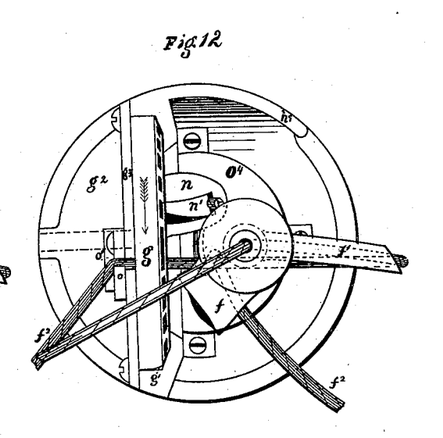
Fig. 12 is a view substantially the same as Fig. 11, except that the slotted disk has made one and one-fourth revolution, (lateral and forward, terms hereinafter explained,) giving to the twine the twist for a single knot.
Figure 13:
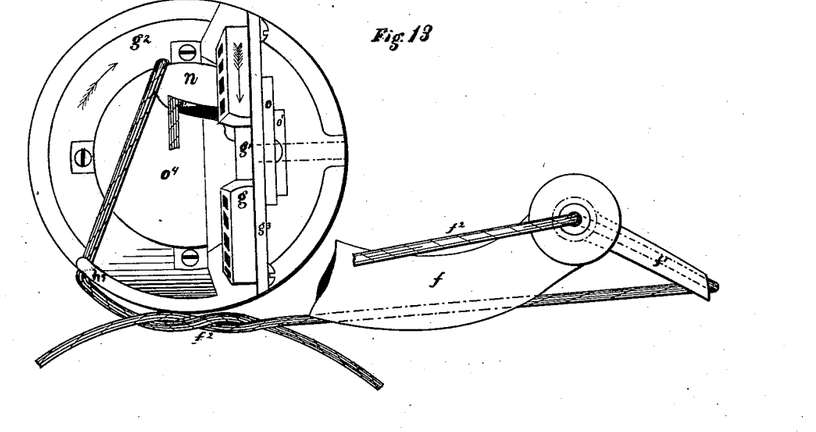
Fig. 13 is a view (front, as to the whole machine) of the knot-tying parts progressed another step. The disk-box, carrying the slotted disk with it, has made a one-half longitudinal revolution backward, and the slotted disk has made a one-fourth lateral revolution backward. (The terms "longitudinal" and "backward" are hereinafter explained.) The needle-arm has moved still farther forward, (meaning toward the end of the machine bearing the main driving-wheel,) and has stretched and tightened the first or single knot.
Figure 14:
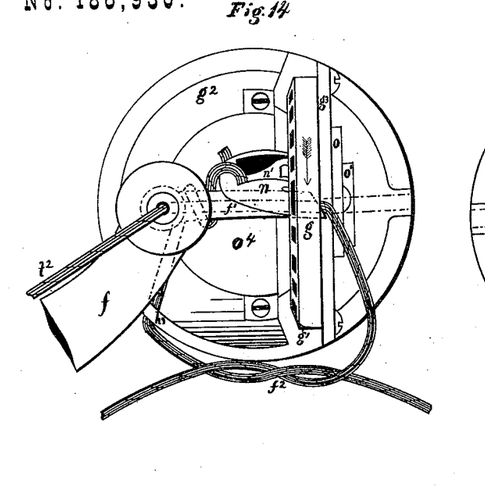
Fig. 14 is a view (front, as to the whole machine) of the knot-tying parts progressed another step from adjustment shown in Fig. 13. The disk has made one and one-fourth lateral revolution forward, (relatively forward—that is, it gives twist to the twine,) giving twist, around the point of the needle, to the twine for the second knot, the needle-arm having retreated, (away from the main driving-wheel,) so as to leave the needle just projecting through the center of the slotted disk.
Figure 15:
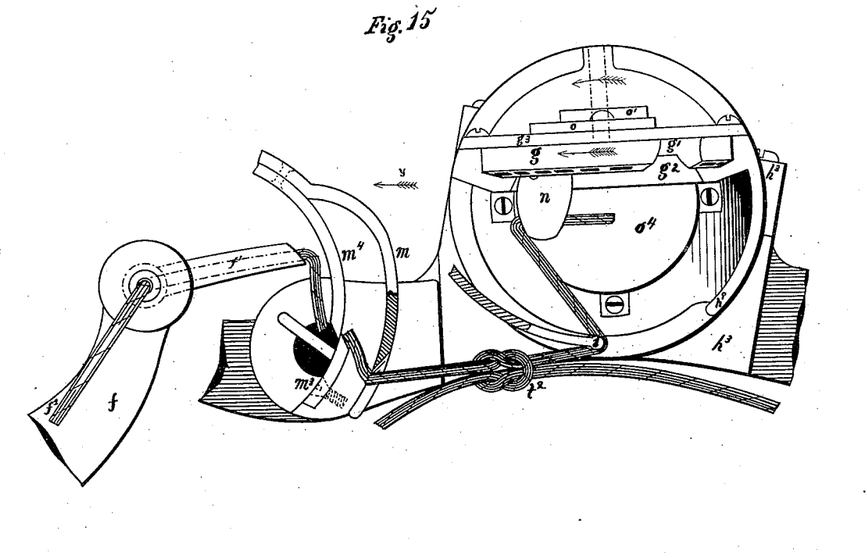
Fig. 15 is a view (front, as to the whole machine) of the knot-tying parts progressed a step from adjustment shown in Fig. 14. The disk-box, carrying the slotted disk with it, has made a trifle more than a one-fourth longitudinal revolution forward, and the slotted disk has made a trifle more than a one-eighth revolution forward. The needle has retreated still further, and the twine-cutting parts have cut the twine.

The slotted disk now makes one and one-fourth lateral revolution forward, giving twist to the twine for a single knot, and leaving the slot in the slotted disk pointing down, as shown in Fig. 12. In giving twist to the twine for this first and single knot the end of twine held by the twine-hold on the face of the slotted disk is twisted around the twine coming from the point of the twine-needle. The disk-box now makes a one-half longitudinal revolution backward, carrying the slotted disk with it. The slotted disk makes a one-fourth lateral revolution backward, leaving the slot pointing to front of reaper, and the needle-arm moves still farther toward the main driving-wheel, stretching the first knot, the needle drawing its end in one direction, and the ear $h^9$ on the disk-box catching and drawing the other end in the opposite direction. This position of parts is shown in Fig. 15. The first knot is now complete. The needle-arm now retreats away from the main driving-wheel, bringing the twine-needle and its end of twine back through the slot in the disk, leaving the needle just projecting through the slot, and the slotted disk again makes one and one-fourth lateral revolution (practically) forward, giving the twist to the twine for the second knot, the twist being made around the point of the twine-needle. This position of the parts is shown in Fig. 14. The needle-arm now retreats a little farther away from the main driving-wheel, thus drawing and stretching its end of twine, the other end being caught and stretched by the stretcher $i$, hung on same shaft with pinion $i^1$, driven by rack-lever $i^2$, operated by cam $i^3$, and held to its work by spring $i^4$, thus drawing and stretching the second knot, the disk-box having made about one-fourth longitudinal revolution forward, and slotted disk making about one-eighth lateral revolution forward. This position of needle-arm, disk, disk-box, and stretcher is shown in Fig. 15.

Figure 16:
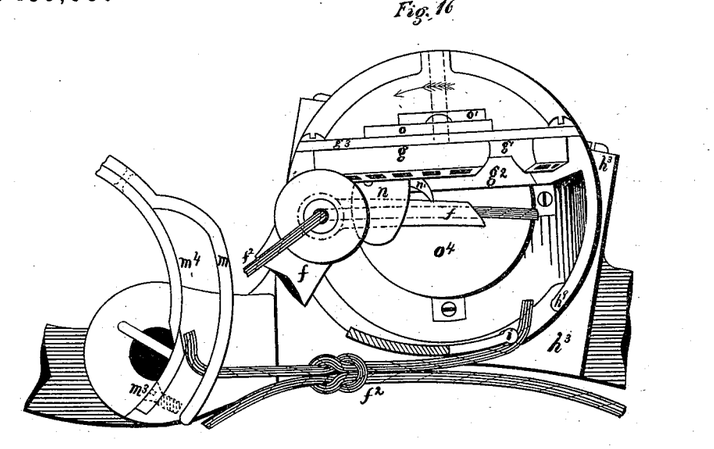
Fig. 16 is a view (front, as to the whole machine) of the knot-tying parts progressed a step from the adjustment shown in Fig. 15. The twine-needle has gone forward so as to enter the twine-hold on the face of the slotted disk, entering and fastening a fresh end of twine and releasing the old.
Figure 17:
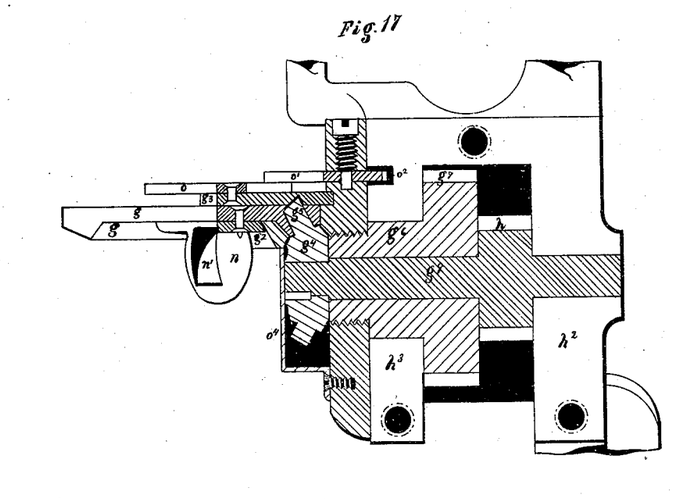
Fig. 17 is a view of the knot-tying parts in section, whose plane is indicated by dotted line $x^2 x^2$, (see Fig. 9,) the slotted disk being turned so that this section cuts through the center of the slot.
Figure 18:
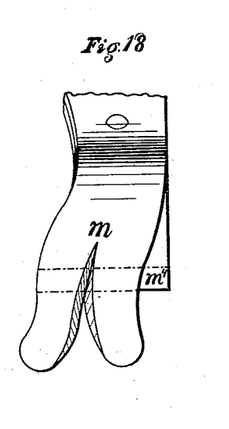
Fig. 18 is a detail view of the knife for cutting the twine, and of the twine-stretcher attached thereto, the arrow $y$, Fig. 15, indicating the position of the observer.

The cutting of the twine is also shown in Fig. 15, and I will describe the operation. Just before the stretcher $i$ comes down to its work the forked twine-retainer $m$, hung on same shaft with pinion $m^1$, driven by rack-lever $m^2$, operated by cam $i^3$, and held to its work by spring $i^4$, comes down, the fork falling astride the end of twine coming from twine-needle, and carrying the twine across the stationary knife $m^3$. The moving knife $m^4$, appurtenant to twine-retainer, comes down and severs the twine, the fork of the twine-retainer holding the twine after it is cut. (All shown in Fig. 15.) The needle-arm now moves forward, entering the twine-hold on the face of the slotted disk, raising its spring-latch, releasing the old end of twine, and entering and fastening a fresh end for a fresh bundle. The stretcher $i$ moves a little farther, so as to draw the old end of twine out from the twine-hold, the twine-needle having raised the latch of the twine-hold so as to permit this release. This position of the parts is shown in Fig. 16.

Figure 5:
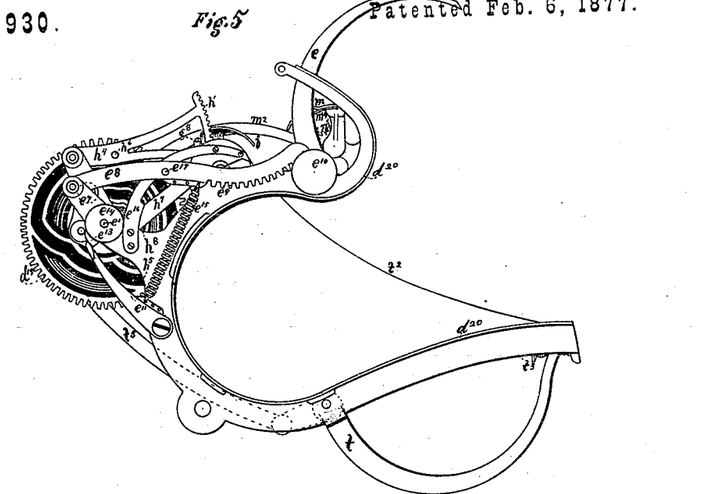
Fig. 5 is a side elevation of the binding apparatus. With reference to its position on the reaping-machine, the view is a rear elevation. The parts are in the normal position of rest, ready to receive and bind a bundle of grain.
Figure 19:
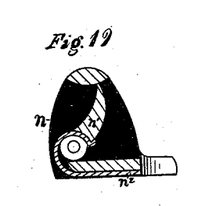
Fig. 19 is a view of the twine-hold, which is on the face of slotted disk, in section—the plane of this section indicated by the dotted line $x^3 x^3$, Fig. 9.
Figure 20:
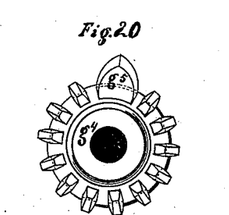
Fig. 20 is a detail face view of the pinion operating the slotted disk.
Figure 21:
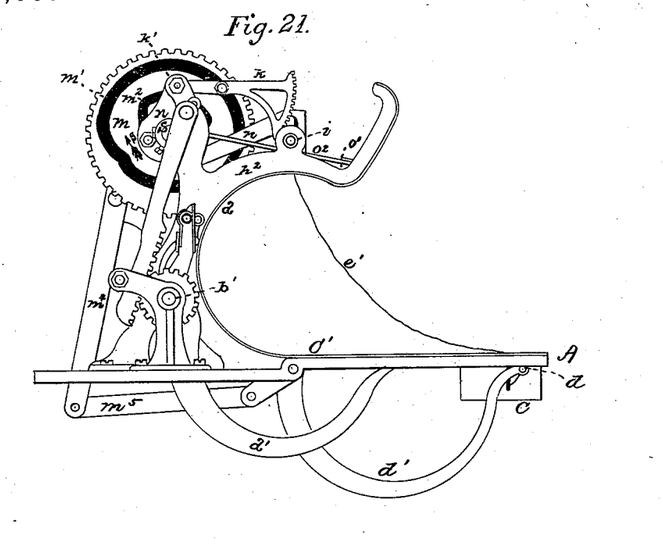
Fig. 21 is a left-side view of a mechanism embodying modifications of my said improvements in the adjustment that the parts have when at rest, and before they have commenced to operate in the binding of a bundle of grain, except that the slotted disk is shown in a vertical position, when, really, in this adjustment, this slotted disk is in the position shown in Fig. 28. (Consider the end A the front end.)
Figure 22:
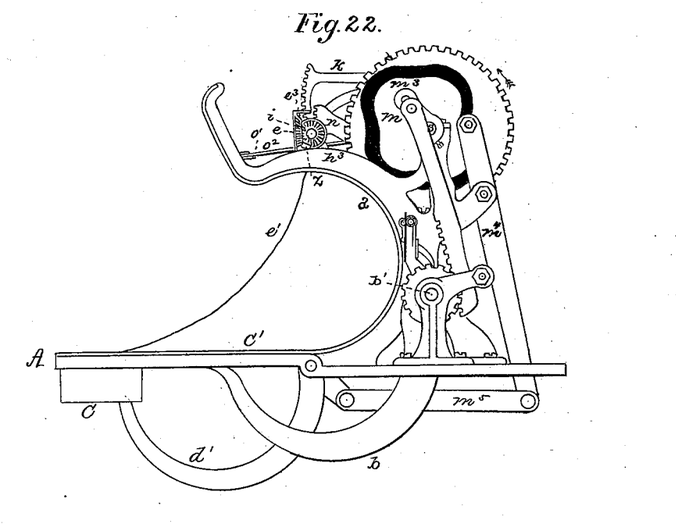
Fig. 22 is a right-side view of the same mechanism shown in Fig. 21, in the same adjustment.
Figure 23:
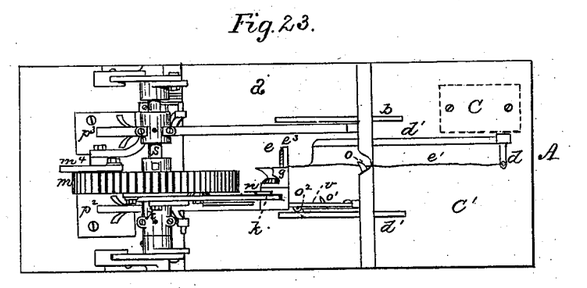
Fig. 23 is a top view of the same mechanism shown in Fig. 21, in the same adjustment.

In this connection I will explain the construction and operation of the twine-hold, which is on the face of the slotted disk. (See section of this twine-hold in Fig. 19.) The body $n$ of the twine-hold is mortised straight through, and in the mortise is hung its latch $n^1$, operated by spring $n^2$. The twine-needle, entering, pressing back the latch, releasing the old end of twine, and retreating, leaves a fresh end of twine fastened under the latch. The needle-arm now retreats to position of rest. (Shown in Figs. 5 and 6.) The disk-box makes one-fourth of a longitudinal revolution forward, and the slotted disk makes about one-eighth lateral revolution forward, to position of rest. (Shown in Figs. 5, 6, 7, 8 and 9.)

I have described the operation of the knot-tying parts in a step-by-step manner. As a matter of fact, the operation is continuous. I have yet to describe the twine-support $o$. It is pivoted to the cap-plate which holds the slotted disk into the disk-box. Its office is to hold the twine in the center of the slotted disk while the twist is given to the twine for the first single knot. The motions of this twine-support are given by lever $o^1$, pivoted to disk-box, its rear end projecting into a groove, $o^2$, in the frame of binder. When in position of rest, this twine-support is in position shown in Fig. 9 until the twist is given to the twine for the first knot, when the slotted disk and disk-box, starting on a backward longitudinal revolution, cause the twine-support to fall.

The pinion which drives the slotted disk has a covering-box, $o^4$, fastened to the disk-box.

I am aware that grain-binders have heretofore been made using wire to bind the bundles of grain, which have had a rotary slotted disk with the slot running to an apex in the body of the disk, and in wire-using binders this apex is essential to give the twist to the wire; but such a slot will not operate in my twine-using binder, which must have an open center in the slotted disk to permit the described operations of the twine-needle, and therefore I do not mean to be understood hereinafter as claiming a rotary disk with any and all forms of slot, but only such a disk having a slot from the periphery to a center opened enough to permit the operations of the twine-needle, such an open center being of no use in a wire using and twisting binder.

I will now describe certain modifications of the machinery hereinbefore described, reference being had to figures of the drawing Nos. 21 to 44, inclusive.

The letters $d^1$ $b$ indicate two grasper-arms, pivoted or hinged on the pin $b'$, and playing up and down through mortises in the base plate $c'$. When they are swung down, the grain is swept over them and against the sheet-metal guard $a$; and these grasper-arms swing up and grasp or press the grain between themselves and the guard $d$, preparatory to the binding of the grain. The mechanism which operates these grasper-arms will not be particularly described hereinafter. Suffice it to say, upon this point, that preparatory to the binding of a bundle of grain these arms swing up and grasp the grain, hold it then grasped till bound, when they drop down and release the bundle.

The grain is not shown in the drawings, as its presence would only confuse and cover up the operating parts. The twine is used off from a common twine-ball, which is held in a common twine-ball holder, $c$, which is attached to the under side of the base-plate $c'$, and the twine passes thence through the right-angled hollow needle $d$, which is upon the end of the vibratory needle-arm $d^1$, coming out at the point of the needle, from whence it runs to the twine-hold $z$ on the back of the slotted disk $e$.

When the grain, in quantity sufficient for a bundle, is swept against the guard $a$, it presses the twine back, and causes it to partially encircle the grain. After the grasper-arms move up and grasp the grain, the needle-arm follows them up. Up to this time the slotted disk $e$ has been in the position shown in Fig. 28. This slotted disk $e$ has two rotary motions, which I will explain and describe at this point. It has a rotary motion around its own axis, as indicated by the arrow $f$, (see Fig. 28,) which I term its "lateral rotation," and that direction of this rotation indicated by the arrow $f$ I term "forward," as it is the motion which gives twist to the twine for the knots.

The box $g$, which supports and carries disk $e$, has a rotation around its own axis, as indicated by the arrow $f^1$. (See Fig. 28.) This rotation of the box $g$ gives a similar rotation to the disk $e$, and such rotation I term "longitudinal." That direction of this longitudinal rotation indicated by the arrow $f^1$ I term "forward."

Figures 24, 25, 40, 41, 42, 43, 44:
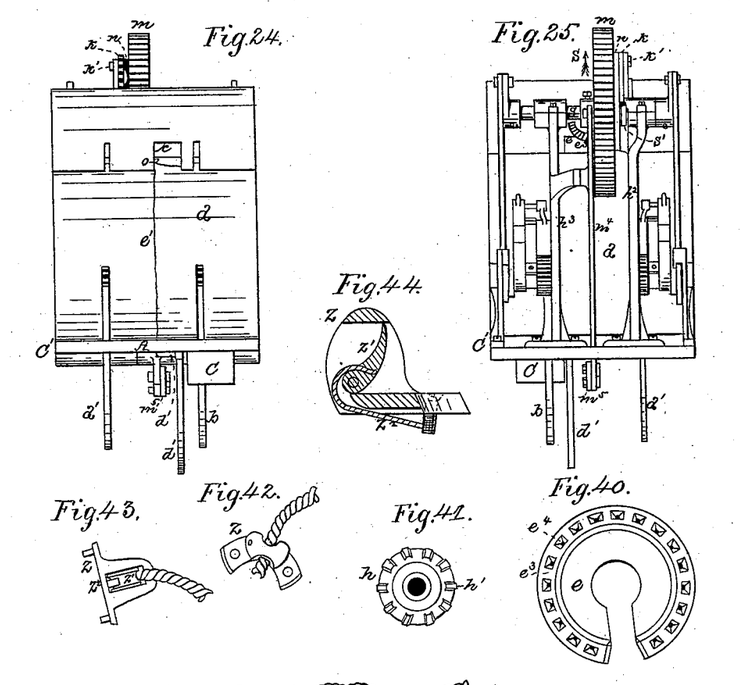
Fig. 24 is a front-end view of the same mechanism shown in Fig. 21, in the same adjustment.
Fig. 25 is a rear-end view of the same mechanism shown in Fig. 21, in the same adjustment.
Fig. 40 is a detail view of the rear face or back of the slotted disk $e$.
Fig. 41 is a detail view of the bevel-pinion $h$, which meshes into the gear on the slotted disk $e$.
Fig. 42 is a detail top view of the twine-hold $z$.
Fig. 43 is a detail face view of the twine-hold $z$.
Fig. 44 is an enlarged detail view, in section, of the twine-hold, the plane of the section indicated by the dotted lines $x^1$ $x^1$ in Fig. 43.
Figure 26:
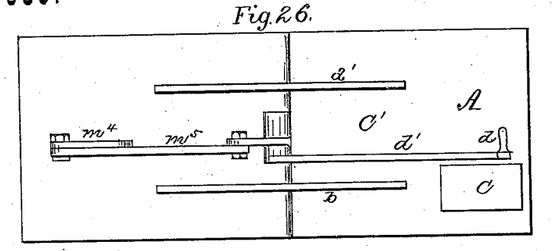
Fig. 26 is a bottom view of the same mechanism shown in Fig. 21, in the same adjustment.
Figure 27:
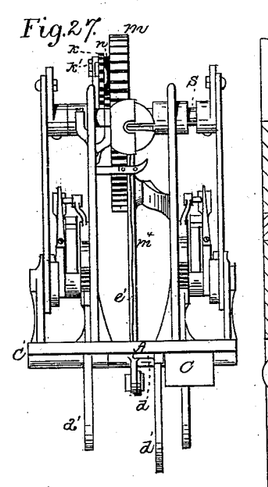
Fig. 27 is a front-end view, the same as Fig. 24, except that the sheet-metal guard $a$ is removed, so as to expose the parts behind it to view.
Figure 30:
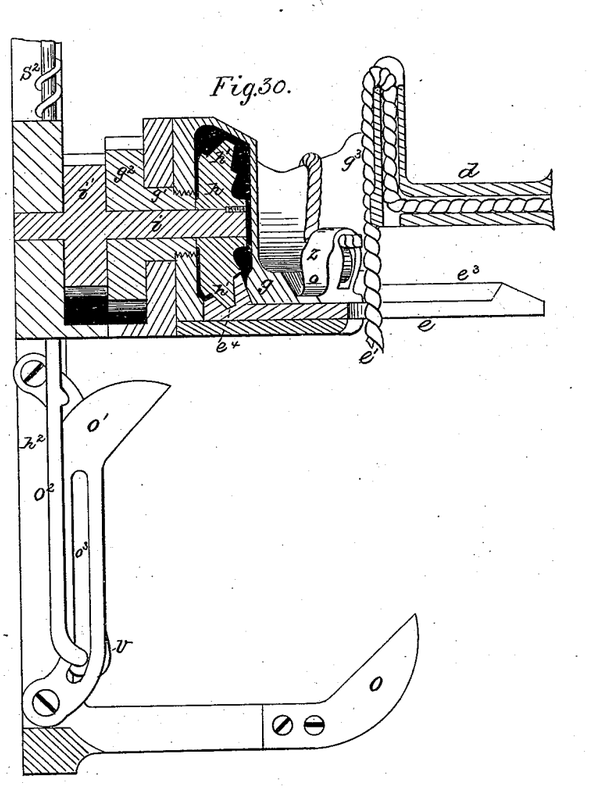
Fig. 30 is a view, in section, of the parts shown in Fig. 29, and in the same adjustment, except that the needle-arm is broken away. The dotted line $x$ $x$, Fig. 29, indicates the plane of this section. This view shows, in addition to the parts shown in Fig. 29, the twine-cutting device.

The means and method of giving these rotations can be mainly explained from Fig. 30. The slotted disk $e$ bears upon one side, which I call the "back," a raised peripheral rim, $e^3$, (see Fig. 40,) in which is sunk a series of gear-mortises, $e^4$, into which mesh the gear-teeth $h^1$ on the pinion $h$. (See Fig. 41.) These knot-tying parts are attached to the left-hand standard $h^2$ of the two standards $h^2$ $h^3$. The shaft $i$ is hung in a box on this standard $h^2$, and has rigid upon it the pinion $i^1$ and the bevel-pinion $h$, meshing into and operating the sunken gear upon the back of the disk $e$. The pinion $i^1$ is operated by the rack-arm $k$, hung on the pivot-pin $k'$, and operated by the cam-groove $m^1$ in the side of the gear-wheel $m$. It is this mechanism which gives the slotted disk $e$ its lateral rotation. The box $g$, which carries the slotted disk $e$, is screwed and fastened on the end of the sleeve $g^1$, hung on the shaft $i^1$, on the opposite end of which is hung and fastened the pinion $g^2$, which is operated by the rack-arm $n$, pivoted on the pin $k'$, and operated by the cam-groove $m^2$ in the left side of the gear-wheel $m$. This mechanism gives the slotted disk $e$ its longitudinal rotation.

The motion of the needle-arm $d^1$ is given by the cam-groove $m^3$ in the right side of the gear $m$, acting through the lever $m^4$ and the connecting-rod $m^5$.

Just before digressing, in order to explain the rotations of the slotted disk $e$ and the mechanism operating the needle-arm $d$, I left the description of the process of binding a bundle of grain at the point where the grasper-arms had moved up to grasp the grain, and the needle-arm had also moved up. I will now proceed from that point.

Figure 8:
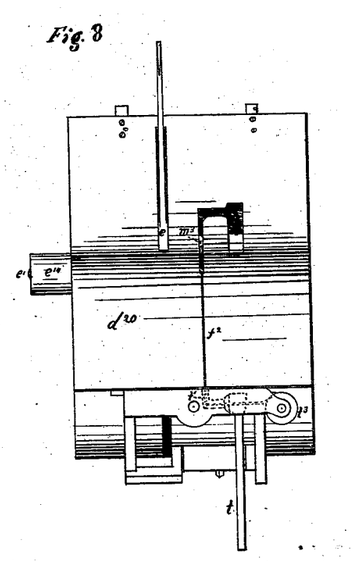
Fig. 8 is a front-elevation view of the binding apparatus. With reference to its position on the machine, the view is from the end opposite the main driving-wheel.
Figure 9:
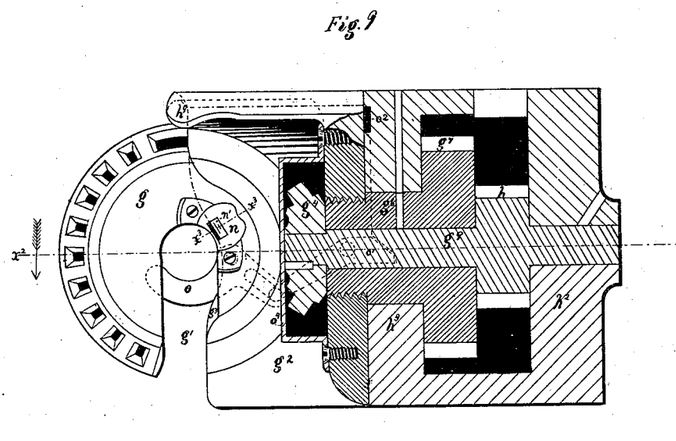
Fig. 9 is a detail view, showing a vertical section of the parts next to and supporting the knot-tying parts. The dotted line $x^1 x^1$ shows the plane of this section. (See Fig. 11.)

When the needle-arm $d^1$ starts to move up, the slotted disk $e$ rotates longitudinally from the position shown in Fig. 8 to the position shown in Fig. 9, the twine-hook $g^3$ catching the twine as the disk swings down. The needle-arm $d^1$ passes toward the rear through the slot $e^2$ in the slotted disk $e$, and the disk $e$ makes a one-eighth longitudinal revolution forward, and by the same motion the disk $e$ is rotated one-sixteenth of a lateral revolution forward to the adjustment shown in Fig. 11. The disk $e$ now makes one and one-fourth lateral revolution forward to the adjustment shown in Fig. 12, giving to the twine the twist for a single knot.

Figures 29, 31, 32, 33, 35:
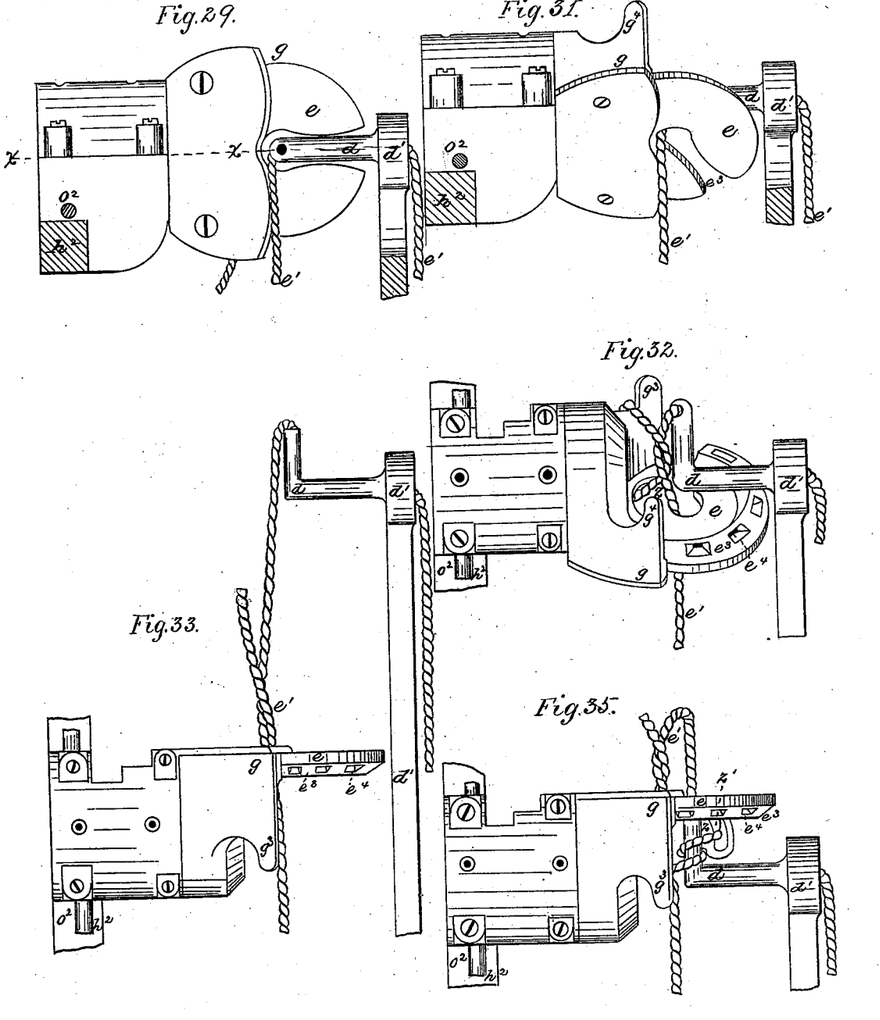
Fig. 29 is a front view of the knot-tying parts only, with the needle-arm $d^1$ moved up, so as to draw the twine proceeding from the needle through the slot $e^2$ in the slotted disk $e$, the twine now being around the bundle of grain.
Fig. 31 is a front view of the knot-tying parts only, in the adjustment next succeeding that shown in Fig. 29. The slotted disk $e$ has made a one-sixteenth lateral revolution forward and one-eighth longitudinal revolution forward, so that the face of the slotted disk $e$ is at right angles to the twine coming from the needle $d$, and running around the front of the bundle of grain.
Fig. 32 is a top view of the knot-tying parts only, in the adjustment next succeeding that shown in Fig. 31. The slotted disk has made one and one-fourth lateral revolution forward from the position shown in Fig. 11, and has given to the twine the twist for a single knot.
Fig. 33 is a top view of the knot-tying parts only, in the adjustment next succeeding that shown in Fig. 32. The slotted disk $e$ has made five-eighths of a longitudinal revolution backward from the position shown in Fig. 32, bringing the face of the slotted disk to rear, the slot in the disk pointing to the right, and the point of the needle-arm $d^1$ has moved to the rear, so as to stretch the twine and perfect the single knot.
Fig. 35 is a top view of the knot-tying parts only, in the adjustment next succeeding that shown in Figs. 33 and 34. The needle-arm $d^1$ has moved toward the front, so that the needle $d$ just projects through the slot in the slotted disk $e$. The slotted disk has made one and one-fourth revolution, lateral and forward, (so far as the twisting action upon the twine is concerned,) from the position shown in Figs. 33 and 34, giving to the twine the twist for the second knot, leaving the slot in the disk pointing downward.
Figure 34:
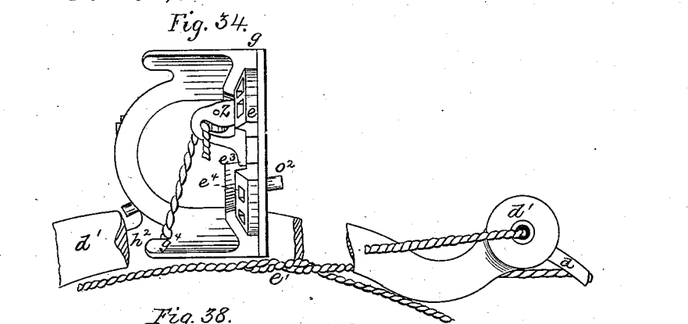
Fig. 34 is a right-side view of the same parts shown in Fig. 33, in the same adjustment.
Figure 39:
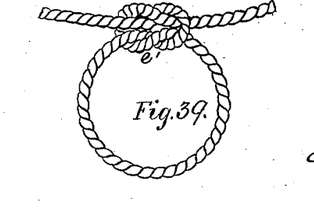
Fig. 39 is a view of the double square knot tied by this mechanism.

The needle-arm $d^1$ now moves to the rear; the disk $e$ makes five-sixteenths lateral revolution backward and five-eighths of a longitudinal revolution backward, leaving the slot $e^2$ pointing to the right, as shown in Figs. 33 and 34, the first knot now being stretched and drawn.

Figures 28, 36, 37, 38:
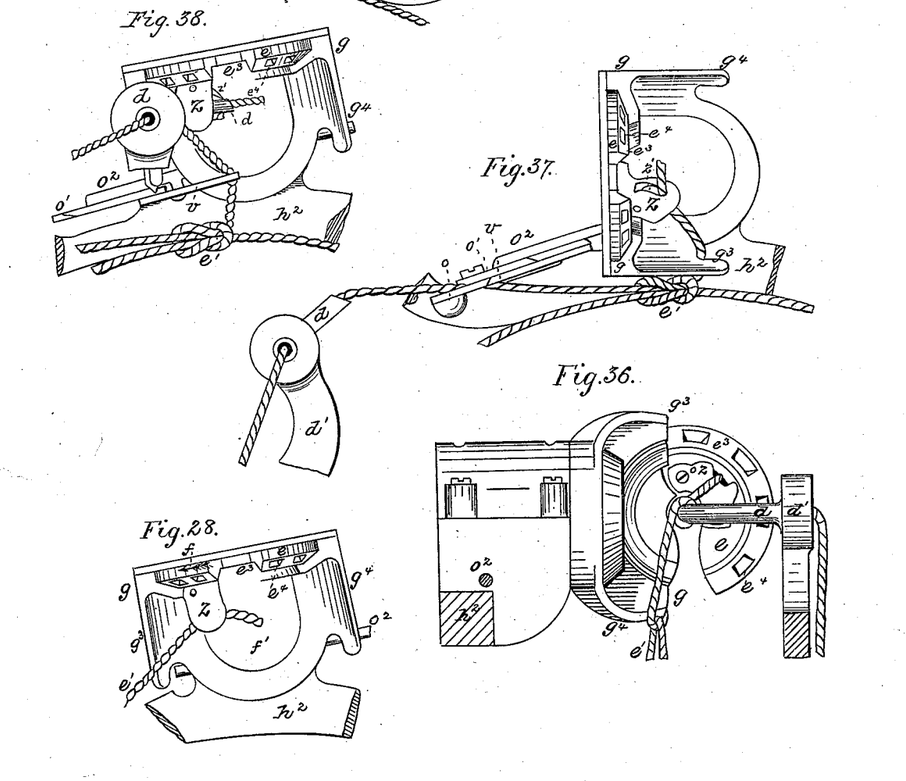
Fig. 28 is a right-side view of the slotted disk $e$ and the box $g$, carrying it, in the adjustment that these parts have when at rest, and previous to commencing to bind a bundle of grain.
Fig. 36 is a front view of the parts shown in Fig. 35, in the same adjustment.
Fig. 37 is a right-side view of the knot-tying parts only, in the adjustment next succeeding that shown in Figs. 35 and 36. The slotted disk $e$ has made a one-half longitudinal revolution forward from the adjustment shown in Figs. 35 and 36, and a one-fourth lateral revolution backward, so that the slot $e^2$ in the slotted disk points toward the right. The point of the needle-arm $d^1$ has moved toward the front, stretching the second knot, and bringing the twine across the stationary knife $o$, ready to be cut.
Fig. 38 is a right side-view of the knot-tying parts only, in the adjustment next succeeding that shown in Fig. 37. The vibratory knife $o^1$ has cut the twine, the slotted disk $e$ has made about a one-eighth longitudinal revolution backward, and about a one-sixteenth lateral revolution backward, from the adjustment shown in Fig. 37. The point of the needle-arm $d^1$ has moved toward the rear, so that the needle $d$ enters the twine-hold $z$, releasing the old twine end.

The needle-arm $d^1$ now swings toward the front till the needle $d$ just projects through the slot $e^2$; the disk $e$ makes one and one-fourth lateral revolution forward, leaving the slot $e^2$ pointing straight downward, and giving to the twine the twist for the second knot, as shown in Figs. 35 and 36.

The needle-arm $d^1$ now moves to the front, drawing and stretching the second knot; the disk $e$ makes one-half of a longitudinal revolution forward, and then gives to the disk $e$ a one-fourth revolution backward, so that the slot $e^2$ points to the right, as shown in Fig. 37.

The twine is drawn across the edge of the stationary knife $o$, projecting from the standard $h^2$, ready to be cut by the pivoted vibrating knife $o^1$, which is operated by the rod $o^2$, its end entering the slot $o^3$ in knife $o^1$. This rod $o^2$ has its forward motion given by the cam $s^1$ on the shaft $s$, and its return or rearward motion by the spring $s^2$. The forward motion of the rod $o^2$ throws the knife $o^1$ forward to cut the twine immediately after the parts come to the position shown in Fig. 37.

Figure 1:
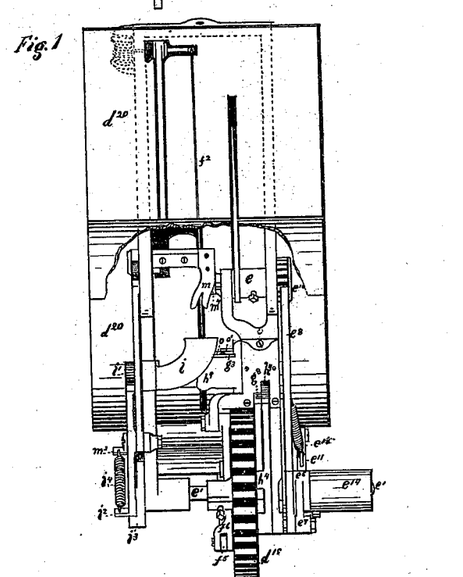
Figure 1 is a top view of the binding apparatus.
Figure 2:
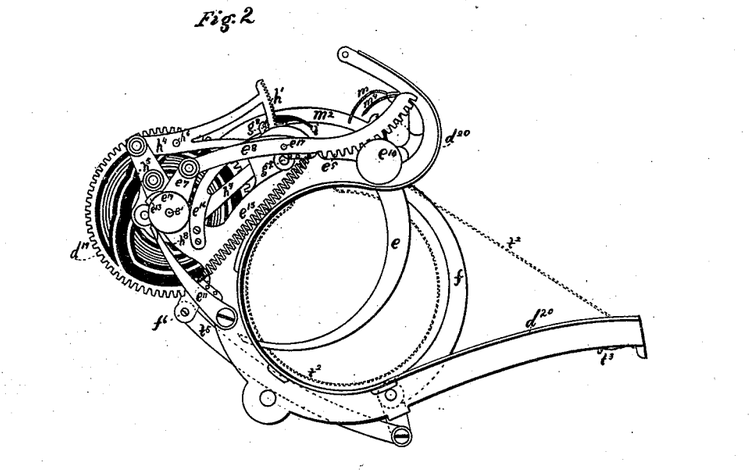
Fig. 2 is a right-side view of the binding apparatus with grasper-arm closed down and needle-arm moved up.
Figure 3:
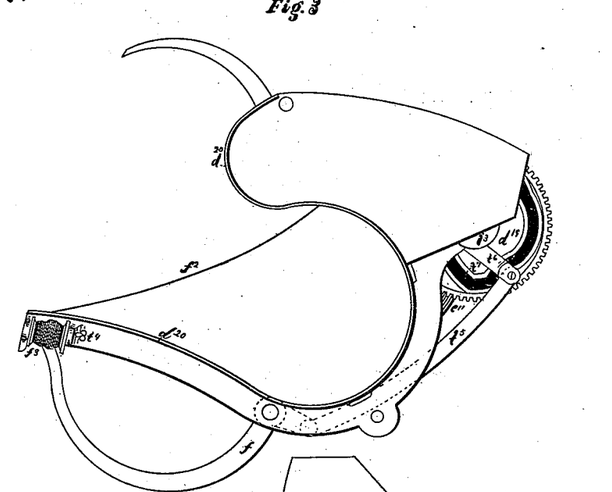
Figure 4:
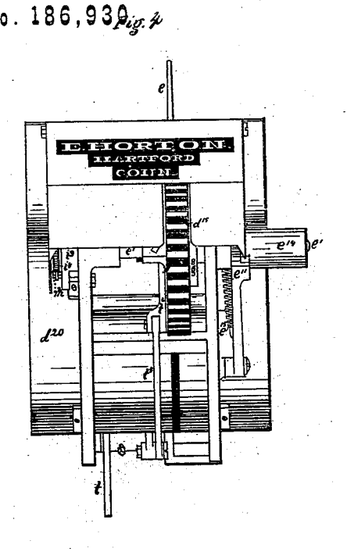
Fig. 4 is a rear view of the binding apparatus in normal position of rest.

When the cam $s^1$ ceases to give forward motion to the knife $o^1$, the rod $o^2$, actuated by the springs $s^2$, flies back with a sudden motion, and throws the pivoted club-arm $v$ outward, causing it to strike the old twine end and pull it from the twine-hold when the needle has entered the twine-hold. The slotted disk $e$ now makes about one-fourth of a longitudinal revolution backward to the position shown in Fig. 11, and it makes about one-eighth lateral revolution backward at the same time. The needle-arm $d^1$ now swings toward the rear till the needle $d$ enters the twine-hold $z$, raising the latch $z^1$, held down by spring $z^2$, the club $v$ releasing the old twine end, and the needle $d$ entering and fastening a fresh end. The needle-arm $d^1$ now falls to the position shown in Fig. 1, the disk $e$ turns longitudinally to position shown in Fig. 28, and the binding of a single bundle is completed.

The letters of the following claims refer only to drawings Nos. 1 to 20, inclusive.

The terms "lateral" and "longitudinal" in the first claim are to be understood and considered as explained in the foregoing specification.

I claim as new and as my invention—

1. The slotted disk $g$, having lateral rotation, in combination with the disk-box $g^2$, having longitudinal rotation.

2. In combination, the rotary slotted disk $g$ and the twine-hold borne on it, all substantially as described.

3. In combination, the hollow angular twine-needle $f^1$ and the vibratory needle-arm $f$, all substantially as described.

4. In combination, the needle-arm $f$, bearing needle $f^1$, and the rotary disk $g$, slotted to an open center, substantially as described.

5. The peculiar bevel-gear on the slotted disk $g$, composed of mortises sunk in a raised annulus, in combination with the pinion $g^4$, having tenon-teeth fitting to the same, all substantially as described.

6. The combinations of the cam-grooves $h^5$ $h^8$ in disk $d^{19}$, rack-arms $g^8$ $h^1$, pinions $h$ $g^7$, shafts $g^9$ $g^6$, bevel-pinions $g^4$, disk-box $g^2$, and slotted disk $g$, all substantially as described.

7. The pinion $g^4$, bearing the extra large tooth $g^5$, in combination with the slotted disk $g$, having slot $g^1$.

8. The combination of the slotted disk $g$, pinion $g^4$, shaft $g^9$, pinion $h$, rack $h^1$, rack-arm $h^4$, cam-groove $h^5$ in disk $d^{19}$, and pin $h^6$, whereby lateral rotation is given to slotted disk.

9. The combination of slotted disk $g$, disk-box $g^2$, shaft $g^6$, gear $g^7$, rack $g^8$, rack-arm $h^7$, with pin upon its side and cam-groove $h^8$ in disk $d^{19}$, whereby longitudinal rotation is given to slotted disk and disk-box.

10. The combination of slotted disk $g$, pinion $g^4$, shaft $g^9$, pinion $h$, rack $h^1$, rack $g^8$, gear $g^7$, sleeve-shaft $g^6$, and disk-box $g^2$.

11. The combination of the grasper-arm $e$, bearing pinion $e^{10}$, rack-toothed pitman $e^8$, arm $e^7$, bearing clutch-half $e^3$ on its hub, clutch-half $e^2$, and spring $e^4$.

12. The combination of the grasper-arm, bearing pinion $e^{10}$, rack-toothed pitman $e^8$, arm $e^7$, bearing clutch-half $e^3$ on its hub $e^6$, clutch-half $e^2$, box $e^{14}$, projection $e^{13}$, pawl $e^{11}$, and ratchet $e^{12}$.

13. The combination of the pivoted needle-arm $f$, connecting-rod $f^5$, lever $f^6$, bearing pin on its side, and cam-groove $f^7$.

14. The rotating disk-box, provided with the ear $h^9$.

15. The combination of the twine-stretcher $i$, pinion $i^1$, rack-lever $i^2$, and cam $i^3$.

16. The forked twine-retainer $m$, combined with and bearing the knife $m^4$, all substantially as described.

17. The combination of the forked twine-retainer $m$, pinion $m^1$, rack-lever $m^2$, cam $i^3$, stationary knife $m^3$, and moving knife $m^4$.

EMMET HORTON.

Witnesses:
 WM. E. SIMONDS,
 JOHN JOHNSON,
 AMOS WHITNEY.